United States Patent [19]

Belmares

[11] Patent Number: 5,104,692
[45] Date of Patent: Apr. 14, 1992

[54] TWO-LAYER ANTIREFLECTIVE COATING APPLIED IN SOLUTION

[75] Inventor: Hector Belmares, Santa Rosa, Calif.

[73] Assignee: Pilkington Visioncare Holdings, Inc., Menlo Park, Calif.

[21] Appl. No.: 516,510

[22] Filed: Apr. 20, 1990

[51] Int. Cl.$^5$ ............................................. B05D 5/06
[52] U.S. Cl. ............................... 427/164; 427/165; 427/419.5; 427/407.2; 427/412.1; 428/447; 156/662; 156/668
[58] Field of Search .................... 427/164, 165, 407.2, 427/412.1; 428/447; 156/662, 663, 668

[56] References Cited

U.S. PATENT DOCUMENTS

| | | | |
|---|---|---|---|
| 2,536,764 | 1/1951 | Moulton | 117/27 |
| 2,593,817 | 4/1952 | Waggoner | 428/389 |
| 2,838,418 | 6/1958 | Starkweather, Jr. | 427/419.5 |
| 3,451,838 | 6/1969 | Burzynski et al. | 427/164 |
| 4,114,983 | 9/1978 | Maffitt et al. | 350/164 |
| 4,137,365 | 1/1979 | Wydeven et al. | 428/412 |
| 4,166,876 | 9/1979 | Chiba et al. | 427/164 |
| 4,173,490 | 11/1979 | Rotenberg | 106/287.14 |

(List continued on next page.)

FOREIGN PATENT DOCUMENTS

| | | |
|---|---|---|
| 0071475 | 2/1983 | European Pat. Off. . |
| 0119331 | 11/1983 | European Pat. Off. . |
| 0194986 | 9/1986 | European Pat. Off. . |
| 56-061412 | 5/1981 | Japan . |
| 59-049502 | 3/1984 | Japan . |
| 59-049960 | 3/1984 | Japan . |
| 60-17409 | 1/1985 | Japan . |
| 60-068319 | 4/1985 | Japan . |
| 61-152708 | 7/1986 | Japan . |
| 61-164676 | 7/1986 | Japan . |
| 61-176582 | 8/1986 | Japan . |
| 61-247711 | 11/1986 | Japan . |
| 62-148902 | 7/1987 | Japan . |
| 1292717 | 10/1972 | United Kingdom . |
| 1462618 | 5/1973 | United Kingdom . |
| 1406567 | 9/1975 | United Kingdom . |
| 1417779 | 12/1975 | United Kingdom . |
| 2082606A | 3/1982 | United Kingdom . |
| 2137648A | 10/1984 | United Kingdom . |
| 2144345A | 3/1985 | United Kingdom . |
| 2167077A | 11/1985 | United Kingdom . |
| 2176794A | 1/1987 | United Kingdom . |

OTHER PUBLICATIONS

J. Coutandin et al., "Diffusion of Dye molecules in Polymers above and below the Glass Transition Temperature Studied by the Holographic Grating Technique", *Macromolecules*, 18:587-589 (1985).
J. Zhang et al., "Investigation of the Mass Diffusion of Camphoriquinone in Amorphous Poly(methyl methacrylate) and Poly(tert—butyl methacrylate), Hosts by the Induced Holographic Grating Relaxation Technique", *Macromolecules*, 19:1390-94 (1986).
B. E. Yoldas, et al., "Anti-Reflective Coatings Applied From Metal Organic-Derived Liquid Precursors", *Applied Optics*, 18:1720, pp. 3133-3138 (1979).

*Primary Examiner*—Michael Lusignan
*Assistant Examiner*—Diana L Dudash
*Attorney, Agent, or Firm*—Townsend and Townsend

[57] ABSTRACT

A two-layer antireflective coating composition stacked on a substrate consisting of allyl diglycol carbonate polymer (CR-39) or glass and comprising a bottom layer containing less than 10% by weight of titanium dioxide equivalent weight and a titanium-free top layer containing polysiloxane resin; and a process for preparing said antireflective coating with improved adhesion on a substrate consisting of allyl diglycol carbonate polymer (CR-39) or glass. The thicknesses of each of said coating layers is in accordance with preselected equations, and the refractive indices of a said coating layers satisfy the following requirements:

$$n_s < n_b > n_t$$

wherein $n_s$ represents the refractive index of the substrate consisting of allyl diglycol carbonate polymer (CR-39) or glass, $n_b$ represents the refractive index of the bottom layer, and $n_t$ represents the refractive index of the top layer.

23 Claims, 3 Drawing Sheets

U.S. PATENT DOCUMENTS

| | | | |
|---|---|---|---|
| 4,199,421 | 4/1980 | Kamada et al. | 522/168 |
| 4,211,823 | 7/1980 | Suzuki et al. | 428/412 |
| 4,217,433 | 8/1980 | Dyball | 525/277 |
| 4,291,097 | 9/1981 | Kamada et al. | 428/412 |
| 4,308,119 | 12/1981 | Russell | 204/159.12 |
| 4,319,811 | 3/1982 | Tu et al. | 351/166 |
| 4,373,076 | 2/1983 | Tarumi | 526/261 |
| 4,374,158 | 2/1983 | Taniguchi et al. | 427/41 |
| 4,405,679 | 9/1983 | Fujioka et al. | 428/216 |
| 4,424,314 | 1/1984 | Barzynski et al. | 522/167 |
| 4,496,686 | 1/1985 | Ansel | 526/314 X |
| 4,525,421 | 6/1985 | Kubota et al. | 528/412 |
| 4,551,361 | 11/1985 | Burzynski et al. | 427/164 |
| 4,556,605 | 12/1985 | Mogami et al. | 428/331 |
| 4,586,996 | 5/1986 | Shinohara et al. | 204/159.13 |
| 4,590,117 | 5/1986 | Taniguchi et al. | 350/165 |
| 4,600,649 | 7/1986 | Leo | 428/412 |
| 4,611,892 | 9/1986 | Kawashima et al. | 427/164 |
| 4,622,376 | 11/1986 | Misura et al. | 526/314 X |
| 4,765,729 | 8/1988 | Taniguchi | 351/163 |
| 4,855,180 | 8/1989 | Kawamura | 427/164 |
| 5,049,414 | 9/1991 | Kato | 427/164 |

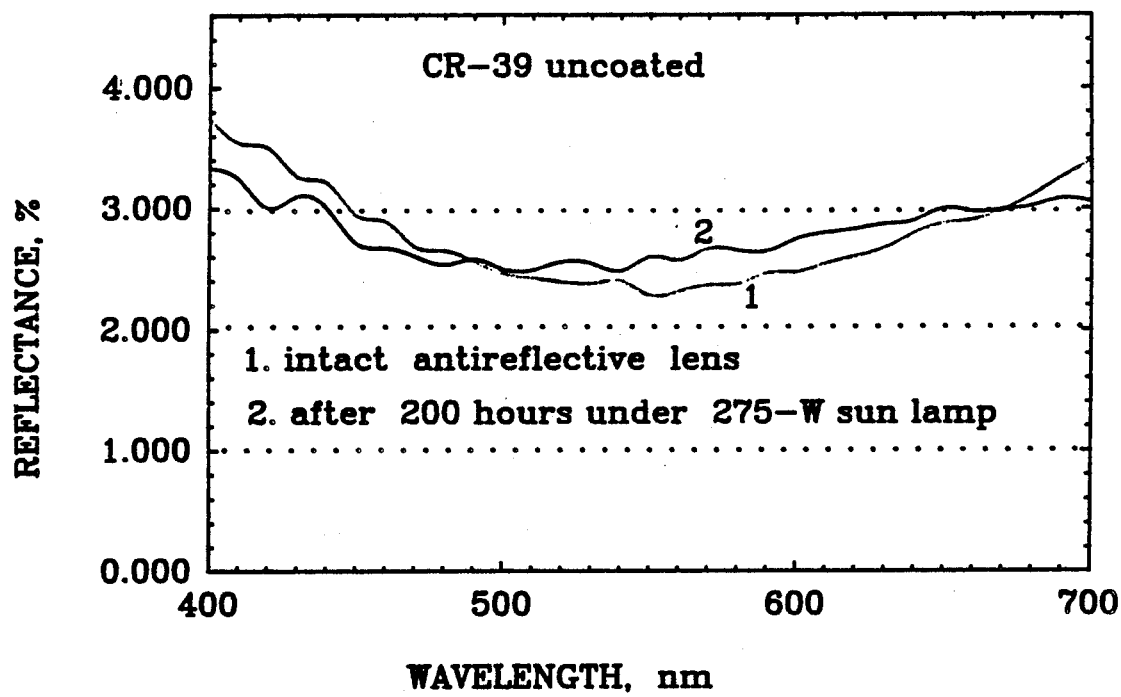
FIGURE 1. Antireflective properties

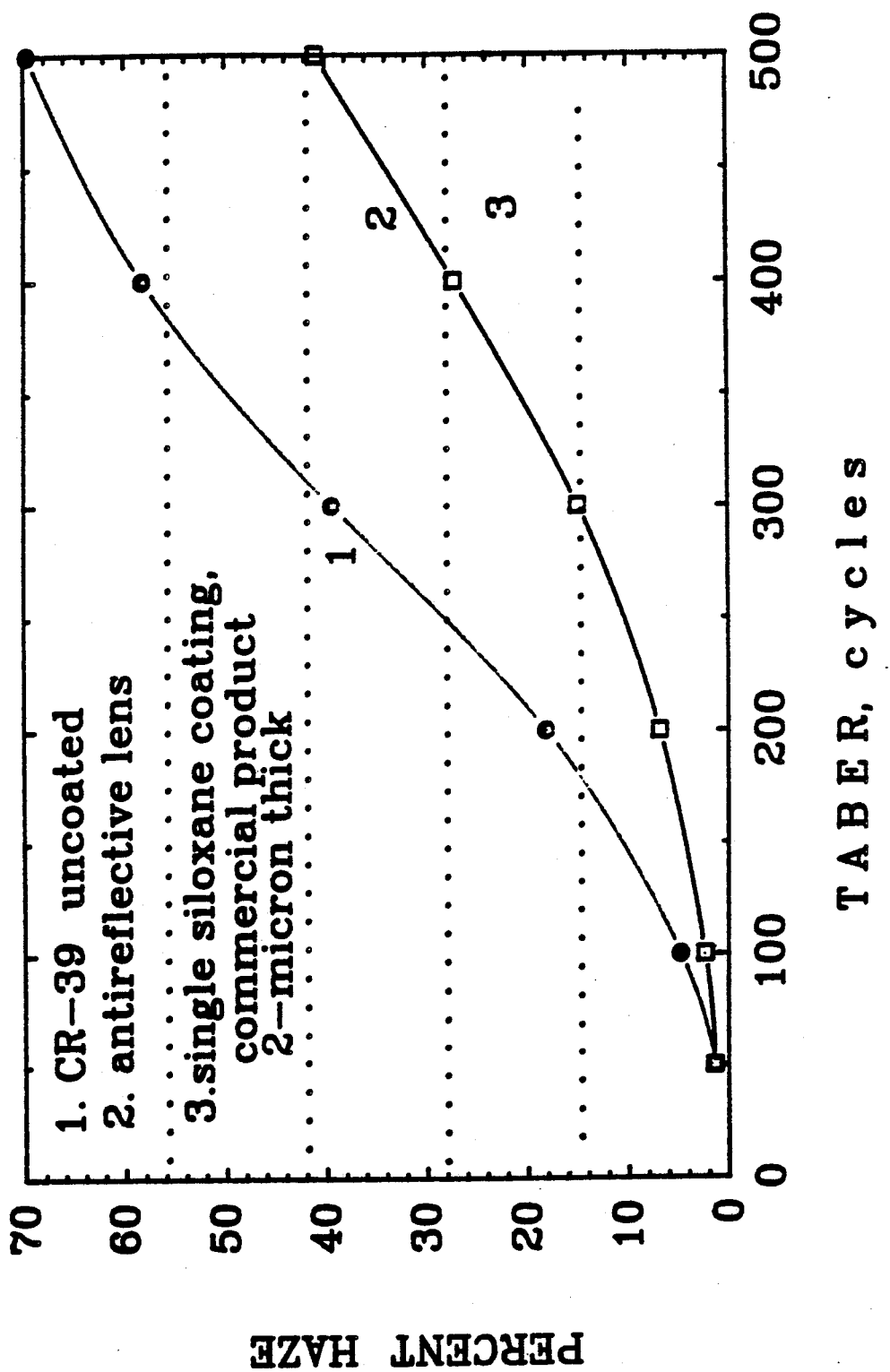

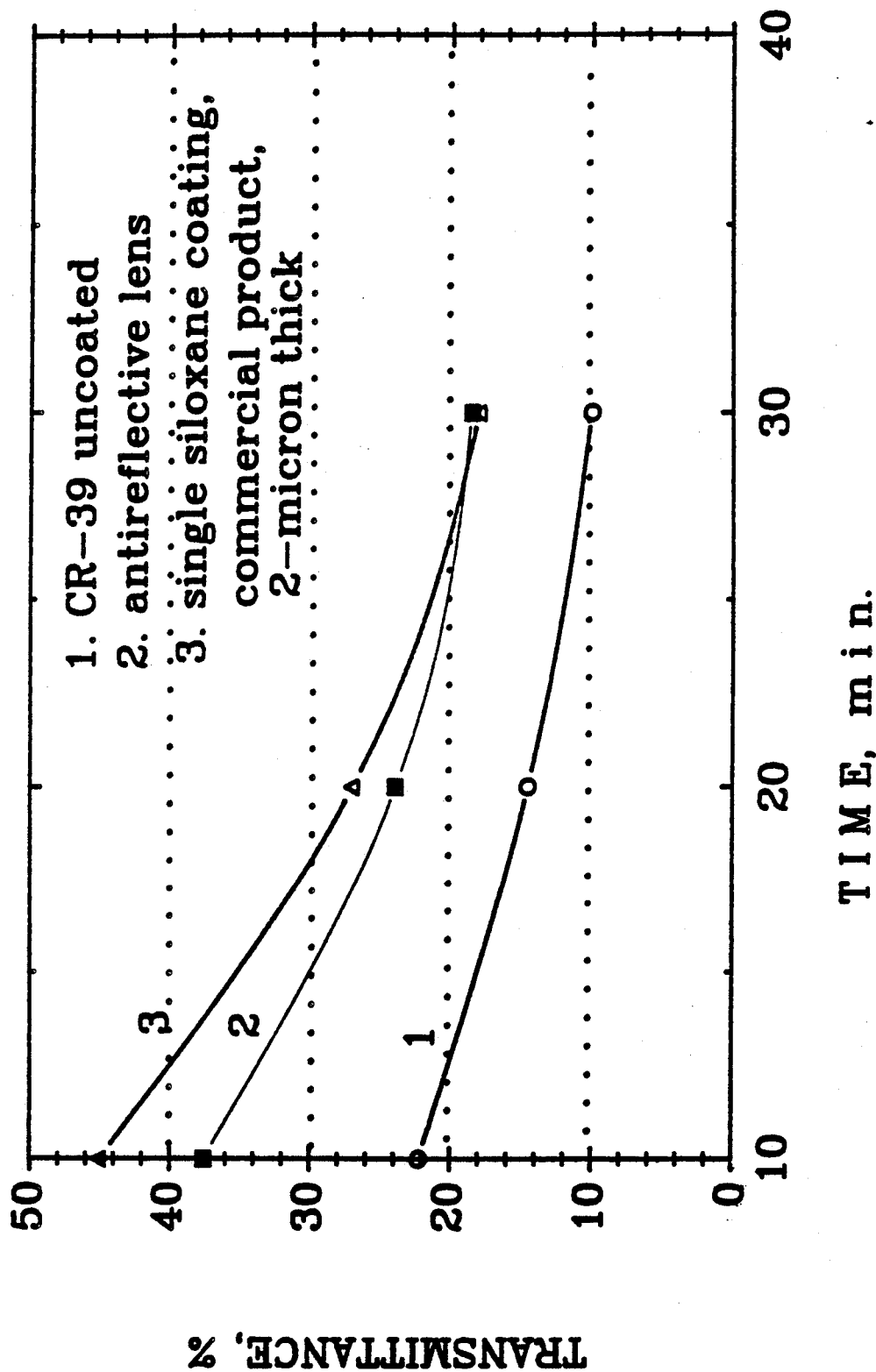

TWO-LAYER ANTIREFLECTIVE COATING APPLIED IN SOLUTION

BACKGROUND OF THE INVENTION

1. Field of the Invention

The present invention relates to a two-layer antireflective coating composition and process for producing the coating. The invention is excellent in durability, heat-, boiling water-, abrasion-, impact-, and ultraviolet light-resistance, and approaches a high degree of cosmetic uniformity. The antireflective coating has an excellent dyestuff permeability and is easy to clean. The antireflective coating can be applied to objects such as lenses, sheets, and rods and can be applied on a single face or both faces of a lens or a sheet. For each layer of the antireflective coating, the thickness is in accordance with a determined equation involving wavelength in air for oncoming light selected from a visible band. The coating is substantially colorless and has a low intensity, neutral color for the reflected light.

2. Description of the Prior Art

When an object is viewed through a transparent material such as an optical plastic, if reflected light is intense, a reflected image called a "ghost" or "flare" is produced in the lens. This phenomenon has the result of producing an annoying and unpleasant feeling to the eyes.

A method to reduce reflected light is known. This method involves coating a substrate with a monolayer of film having a lower refractive index than the substrate. It is known that the selection of coating thickness of the material adjacent to the substrate is very important in order to obtain the beneficial reflection-preventive effect. For example, in the case of a monolayer coating film, when the optical thickness of the monolayer is adjusted to ¼ of the wavelength of the objective ray or an odd number of times thereof, a minimum reflectance and maximum transmittance is obtained. The term "optical thickness" is defined as the product of the refractive index of the coating layer times the thickness of the coating layer.

Formation of multilayer antireflective coatings with proposed selection of thicknesses is also known (see UK Patent No. 1,417,779, U.K. Patent No. 1,406,567, and U.K. Patent No. 1,292,717). However, such antireflective coatings are formed by vacuum evaporation deposition. This process poses the following problems in fields of application such as production of antireflective coatings on plastic substrates:

1. A high degree of vacuum results in restriction on the substrate size and type.
2. Manufacturing time is prolonged.
3 Heating to a certain temperature and for a certain length of time may cause distortion of the plastic substrate.
4. Inorganic oxides which are primarily used in layer-forming coating materials, yield reduced adhesion and heat resistance when applied to a plastic substrate. This is due to differences in thermal expansion (the difference in the coefficient of linear expansion between the coating film and the substrate).
5 Dyestuff permeability is completely lost.
6. Productivity is low and the production costs are high.

Other methods for producing antireflective coatings in which use of the vacuum evaporation deposition technique is not used have also been disclosed. These include a method in which a coating containing fine particles is formed (see U.S. Pat. No. 2,536,764) and a method in which an optical element of polymeric material is provided with a microstructured surface (see U.S. Pat. No. 4,114,983 and U.K. Patent No. 1,462,618). However, the light transmitted through the transparent material is also scattered, thus transmittance cannot be effectively improved. There is a known method in which a silicon coating is formed on a plastic substrate and then subjected to plasma polymerization to attain an antireflective effect (see U.S. Pat. No. 4,137,365). However, the dyestuff permeability is lost, the productivity is low, and the production cost is high.

An antireflective coating film having a dye-stuff permeability, which is formed by treating an organic film containing inorganic fine particles with an activating gas (see U.S. Pat. No. 4,374,158) has been proposed and found to lack heat resistance and water resistance at high temperatures. There is also known an antireflective coating for a solar cell in which the substrate is covered with a liquid two-layer coating. $TiO_2$—$SiO_2$ (titanium dioxide-silicon dioxide)-forming compounds are used for the first layer and $SiO_2$ (silicon dioxide)-forming compounds are used for the second layer (see Applied Optics, Vol. 18, No. 18, pages 3133–3138). However, this antireflective coating film has no dyestuff permeability and is readily cracked or broken by thermal or mechanical deformation.

Preparation of ultra-thin monomolecular fluorinated siloxanes for antireflective coatings has been described. These films are useful to obtain a surface which is easy to clean, slippery, and protects the inorganic antireflective coating underneath (see JP Patent No. 61164676 and JP Patent No. 62148902). However, application of this type of film coating requires an extra step in an already multi-step operation. Thus, there is a significant increase in the manufacturing cost.

Moreover, methods to form antireflective films in solution have been described recently (see U.S. Pat. No. 4590117, EP Appl. 0119331, Jpn. Kokai Tokkyo Koho JP 59049502, JP 60068319, JP 59049960, and DE 3369568). However, the interface adhesion between the coatings is poor after boiling in water. The weather resistance is also poor and results in a severe loss of abrasion resistance over time. This is especially true for coatings with a high titanium dioxide ($TiO_2$) content. Fade-meter exposures of 20 hours (see U.S. Pat. No. 4,590,117, page 15, lines 2-5), were considered to be good measures of light resistance, even though the transmittance of the coated sheet did not change. The exposure time was relatively short for a stability test. These problems will be discussed in-depth in the following paragraphs.

Coating instability is manifested in wearing trials, when coatings applied to such substrates as glass of CR-39 lenses, become easily damaged and scratched after heavy exposure to sunlight. (The chemical name for CR-39 is allyl diglycol carbonate polymer, and it is also referred to as optical plastic. Hereinafter, in the specification and in the claims, allyl diglycol carbonate polymer will be designated by the term CR-39 substrate.) In addition, the coatings can wear off from the lens surface due to coating degradation and weakening of the coating surface. This weather sensitivity is due to the highly oxidant character of $TiO_2$ (in the high refractive index layer(s)) when it interacts with light.

The photooxidation of $TiO_2$ is well known. The following are examples: a) Photooxidation of binders such as alkyd paints through the formation of peroxy and hydroperoxy radicals (CA79(2):6859q); b) Photooxidation of polyethylene (CA100(24):193058q); c) Photooxidation of hydrocarbons (CA102(18):157786H); d) Photooxidation of waste waters loaded with organic material (CA90(22):174281r); e) Photooxidation of ornithine and putrescine (CA89(3):24761j); f) Photooxidation of water (CA99(4):28572f); g) Photooxidation of sulfur dioxide (CA101(16):140933K; h) Photooxidation of cyanide ion (CA103(10):79294a; i) Photooxidation of ethylene (CA97(13):109378h; j) Photooxidation of alcohols (CA96(9):68081q; k) Photooxidation of olefins (CA95(22):192971y): l)Photooxidation of commercial polyethylene (CA87(12):85680r); etc.

Another undesirable feature in the above mentioned patents is the use of an additional hydrolysis step to produce $TiO_2$ when forming the titanium containing layer. The mentioned patents incorporate an indiscriminate amount of silane monomers in the coating composition. In the present invention, it was determined that a restricted set of chemical compositions is needed to produce coatings that effectively satisfy the requirements mentioned and to produce a maximum transmittance with a minimum reflectance. Also, prior patents have claimed two- and three-layer coatings. It was found that two-layer coatings applied to CR-39 lenses have very poor UV resistance, which becomes increasingly worse as the $TiO_2$ content of the layer adjacent to the substrate increases. We experimented without success with known antioxidants (Irganoxes) and/or UV stabilizers (hindered amines) to try to improve the poor UV resistance. Additionally, we found that with two-layer coatings in which the first layer (adjacent to the CR-39 substrate) is composed of only $TiO_2$, the resistance to photooxidation and boiling water was poor. This is due to the fact that a pure $TiO_2$ layer has very poor adhesion when directly applied to CR-39 substrates, even when these substrates are etched with strong bases.

SUMMARY OF THE INVENTION

It is a primary object of the present invention to provide a two-layer antireflective coating composition stacked on a CR-39 or glass substrate which is excellent in heat-, boiling water-, abrasion-, impact-, and ultraviolet light-resistance, and which has an improved adhesion, durability and dyestuff permeability. The coating is substantially colorless and has a low intensity, neutral color for the reflected light.

Another object of the present invention is to provide a two-layer antireflective coating composition, wherein the thicknesses of each of two coating layers is in accordance with preselected equations, and the refractive indices of the coating layers satisfy the following requirements:

$n_2 < n_b > n_f$ wherein $n_f$ represents the refractive index of the substrate, $n_b$ represents the refractive index of the bottom layer (adjacent to the substrate), and $n_t$ represents the refractive index of the top layer. Customary coating methods may be adopted in order to control the coating thickness such as curtain flow coating, dip coating, roller coating and spin coating. We prefer spin coating.

More specifically, in accordance with the present invention, there is provided a two-layer antireflective coating composition stacked on CR-39 or glass substrate. The coating comprises a bottom layer that in the cured state contains less than 10% by weight of titanium dioxide equivalent weight. As it is stated later on, the metal oxide could have alkoxides as precursors or be in a liquid suspension or emulsion, typically in water, alcohols or cellosolves. To enhance the UV stability of the bottom layer, the binding polysiloxane resin is a copolymer of phenyltrialkoxysilane and gamma-glycidoxypropyltrialkoxysilane. The siloxane from phenyltrialkoxysilane confers to the coating, resistance to $TiO_2$-catalyzed photooxidation (analogously, silicon oils derived from phenyl compounds are extremely stable towards thermal degradation). This combination of less than 10% titanium dioxide and 90% or greater polysiloxane also lifts the refractive index of the coating.

The U.S. Pat. No. 4,590,117 states on page 5, lines 7-13, that, "It is indispensable that the above-mentioned metal compound be contained in an amount, as the metal oxide equivalent weight, of at least 10% by weight based on the weight of the coating layer-forming components. If the amount of the metal compound is smaller than 10% by weight, the antireflective effect is undesirably low." claim 1, page 23, lines 21-24 of that same patent reads: "the composition for forming the cured layer contiguous to the substrate comprising at least 10% by weight as the metal oxide equivalent weight, based on the weight of the layer-forming coating components". Patent No. EP 119,331 also states the same as the mentioned U.S. Pat. However, we have found that by maintaining the level of $TiO_2$ below 10%, and hydrolyzing a mixture of an epoxytrialkoxysilane and a phenyltrialkoxysilane to form the polysiloxane copolymer used in forming the bottom layer, we can avoid the problems of photooxidation arising from the presence of the larger quantities of the metal oxide in the bottom layer of a two-layer coating. Under these new conditions, we are able to achieve neutral reflected colors and a satisfactory antireflection performance for a two-layer antireflective coating, besides the other excellent properties mentioned at the beginning of the present heading.

BRIEF DESCRIPTION OF THE DRAWINGS

FIG. 1 is a graph comparing the reflective photospectrum of an uncoated CR-39 lens and an intact CR-39 antireflective coated lens exhibiting a neutral lavender reflected color. The graph also shows the reflective photospectrum of the mentioned antireflective coated lens after 200 hours under a 275 watt sun lamp at a distance of 24 cm.

FIG. 2 is a graph comparing the abrasion resistance properties of an uncoated CR-39 lens, of an antireflective CR-39 coated lens, and of a commercial antiscratch CR-39 lens coated with a 2 micron thick polysiloxane.

FIG. 3 is a graph comparing the tintability properties (dispersion dyes) of the same lenses mentioned in FIG. 2.

DETAILED DESCRIPTION OF THE PREFERRED EMBODIMENTS

Photooxidation by titanium dioxide ($TiO_2$) occurs upon interaction with light. To decrease the severe photooxidative degradation by $TiO_2$, the bottom layer in the cured state must contain less than 10% by weight of titanium dioxide equivalent weight. Preferably 4% to 10%, most preferably, 6% to 9%. Lower amounts of TiO$_2$ can also be used, but the antireflective properties would be undesirably low even when the resin itself in the cured state has a refractive index around 1.53.

When a two-layer antireflective coating was made containing 12% of TiO$_2$ in the bottom layer, the photooxidation effects were already severe after 98 hours under the 275 watt sun lamp. However, the antireflective coated lens with 7.3% TiO$_2$ in the bottom layer even after 200 hours under the same sun lamp did not show the extensive degradative effects of UV light. These degradative effects are clearly shown if the exposed lens is subjected to a 10-min tinting in boiling water. When the photooxidation is severe, the coating comes off in patches or totally from the lens surface. In wearability tests this is manifested by a peeling off of the coating after a few months of wearing the lenses. When the bottom layer contained 18% TiO$_2$, almost all the coating came off from the lens surface after 98 hours of exposure to the sun lamp. Increased percentages of TiO$_2$ catalyze the photooxidation must faster until finally above 50% TiO$_2$ the severe effects can be manifested after 30 hours of exposure. Additionally, the decreased amount of polysiloxane resin binder due to the increase of TiO$_2$ content in the layer brings a decreased adhesion of the layer to the caustic-etched CR-39 surface and to the top layer. Finally at 100% TiO$_2$ in the bottom layer, the adhesion is very poor toward boiling water and the weatherability is also very poor.

The polysiloxane resin binder has other functions besides being a good binder for TiO$_2$. It must improve the boiling water resistance of the two-layer coating, must improve the uniformity of the coating thickness, must not have negative effects on the stability of the coating solution, and must contribute to the photooxidation resistance of the antireflective coating. The coating solution is used to form the layer before it is cured, and the various components comprising the coating solution will be discussed in detail further in the specification. The increased stability of the coating solution is due to the stabilizing ability of the polysiloxane resin. When organic titanium compounds such as tetraisopropyltitanate (TPT) become hydrolyzed by absorption of moisture from the air, the available functional groups on the polysiloxane resin attach to the TiO$_2$ colloids, thus avoiding clumping of the layer. The polysiloxane functional groups thus prevent coating contamination by visible particles of the dioxide. This is important for the production of good quality coatings.

The polysiloxane resins in the bottom layer should preferably have a refractive index that contributes positively in lifting the refractive index of the layer since we have relatively small amounts of the refractive index lifter, TiO$_2$. In the present invention, the polysiloxane resins are comprised of at least two siloxane monomers in a ratio by weight based on the weight of the combined silane monomer mixture. In turn, the resulting polysiloxane resins in the bottom layer should preferably be in a ratio (described below) to the organic titanium by weight of the combined polysiloxane/titanium dioxide.

In determining which siloxane monomers worked most effectively as precursors of polysiloxanes, it was found that combinations of phenyltrialkoxysilane (such as phenyltrimethoxysilane) and gamma-glycidoxypropyltrialkoxysilane (such as gamma-glycidoxypropyltrimethoxysilane) after forming the respective polysiloxane were highly resistant to photooxidation by TiO$_2$, particularly when the proportion of TiO$_2$ in the coating was below 10% by weight of the cured coating layer-forming components. Thus, an organic titanium compound (precursor of TiO$_2$) such as TPT comprising from about 1%-29% by weight based on the total combined weight of the organic compound+polysiloxane copolymer can be used in the present invention. This range for the TPT will give a range of 0.28%-10% for TiO$_2$ content in the total weight of TiO$_2$+polysiloxane copolymer. If we change the precursor of TiO$_2$ then the ranges of organic titanium will change again to accommodate a range of 0.28%-10% TiO$_2$+polysiloxane total combined weight. As it was mentioned above, the preferred range for TiO$_2$ is 4%-10% and most preferred is 6%-9% in the total combined weight (described later on as equivalent weight) of TiO$_2$+polysiloxane copolymer.

The phenylsilane derivative (phenyltrialkoxysilane, such as phenyltrimethoxysilane) contains a phenyl ring, which acts to raise the refractive index of the polysiloxane resins. The siloxane moiety resulting from the hydrolysis and polymerization of the monomer contributes to the photooxidation resistance of the bottom layer in the presence of less than 10% by weight of TiO$_2$. It is well known that polysiloxanes (silicone oils) that contain phenyl rings are very resistant to thermal oxidative degradation. An excess of the phenyl compound would impair the adhesion properties of the coating. On the other hand, an excess of the gamma-glycidoxy compound, although promoting adhesion, would make the polysiloxane binder very susceptible to photooxidation due to the already high oxygen content in the molecule of the monomer. Thus, the range for the phenyltrialkoxysilane monomer that resulted in the best adhesion properties and best photooxidation resistance of the coating was 20%-80% by weight of the combined silane monomer mixture and preferably from about 47%-67%. The range determined for the other monomer in the combination, gamma-glycidoxytrimethoxysilane monomer, was from about 20%-80% by weight of the combined silane monomer mixture and preferably from 33%-53% by weight of the combined silane monomer mixture.

By selecting an organic titanium compound that hydrolyzes rapidly in water, the present coating invention does not need a special second treatment to undergo hydrolysis. This saves time and cost of production. We selected organic titanium compounds such as tetraisopropyl titanate (IPT), or tetraethyl titanate (TET), and less preferably tetrabutyl titanate (TBT), instead of higher titanium akoxides or chelates such as the acetylacetonate which are too slow to hydrolyze. We thus avoid an additional hydrolysis step as reported in prior art patents (EP 119,331 and US 4590117). The reason is that the lower titanium alkoxides hydrolyze rapidly in air as well as in the water produced by siloxane polymerization which occurs during curing. We also do not have to control humidity (6 g-180 g/kg-air) for at least one second, and cure at elevated temperatures as reported in Patent JP 61091601.

A refractive index equation (A) involving the bottom layer of the present invention was determined by regression analysis. The selected composition of the bottom layer was comprised of a polysiloxane resin made from a monomer mixture consisting of 57% phenyltrimethoxysilane and 43% gamma-glycidoxypropyltrimethoxysilane, in any proportion to TPT by weight, the TPT giving TiO$_2$ by hydrolysis. The equation is as follows:

(A) ref. index (sodium line) = (0.00361)(% TiO$_2$) + 1.530

The equation (A) shows the relationship between the refractive index of the solid content equivalent weight for the 57/43 silane monomer ratio with varied proportions by weight of TiO$_2$. The solid content equivalent weight referred to herein means the amount equivalent to the formula weight corresponding to the silane hydrolysis product R-SiO$_{1.5}$. For example, in the case of phenyltrimethoxysilane [C$_6$H$_5$Si(OCH$_3$)$_3$ (molecular weight = 198 g)], the solid equivalent weight of 1 g of this compound is the amount corresponding to C$_6$H$_5$SiO$_{1.5}$ (molecular weight = 129 g), that is, 0.652 g or 129/198 g. For methyltrimethoxysilane, the solid equivalent weight of 1 g of this compound is 0.493 g. Additionally, 1 g of TPT gives 0.279 g of TiO$_2$. Thus, the percent of TiO$_2$ can be calculated from the mixture of both TiO$_2$ and the solid content equivalent weight of the siloxane polymer.

The correlation coefficient was found to be 0.999, practically 1.0. By extrapolation, 100% TiO$_2$ would have a refractive index of 1.89. This value is close to the value obtained by hydrolysis of TPT with simultaneous vapor deposition at low temperatures (150° C.). These films are amorphous, have a refractive index of 2.0, and are of a uniform thickness. Annealing in air at 350° C. converts the film to the anatase tetragonal crystallization form. At 1000° C. the film is completely rutile with a refractive index of 2.5 (cf CA75(6):41458x; from a 1971 publication). From these experiments, it was shown that TiO$_2$ results from hydrolysis in the bottom coating layer. Slight differences in porosity and errors in extrapolation account for the differences in refractive index. The existence of differences in porosity can be shown. For example, amorphous TiO$_2$ thin films deposited by electron-beam-evaporation below 120° C. substrate temperature had a refractive index of 2.15(cf CA86(20):148009f from a 1976 publication). Looking back to equation (A), at 0% TiO$_2$ the refractive index of the resin from the equation is 1.530, which corresponds to the real value of the cured polysiloxate resin alone. Notice that this value is higher than the value for the CR-39 substrate which is 1.500. This is due to the presence of phenylsiloxane derivative in the resin which acts to raise the refractive index. Otherwise, the refractive index of the base siloxane resin would be below 1.500.

The bottom layer can also incorporate flow additives, ultraviolet absorbers, etc., if so desired.

The top layer of the two-layer antireflective coating is also important. With the bottom layer protected against photooxidation and with the right composition for interlayer adhesion (as described before), the top layer can have a variety of compositions. We prefer compositions based on polysiloxanes derived from gamma-glycidoxyalkyl-trialkoxysilanes preferably gamma-glycidoxypropyltrimethoxysilane or combinations with alkyltrialkoxysilanes preferably methyltrimethoxysilane. The former siloxanes promote adhesion while the latter siloxanes decrease the refractive index of the polysiloxane copolymer. Too much of the latter ones will impair adhesion. The generally acceptable range of methyltrimethoxysilane was determined to be 0%-70% by weight of the silane monomer mixture. Consequently, the range for gamma-glycidoxypropyltrimethoxysilane is 30%-100% by weight of the silane monomer mixture. The top layer can incorporate additives to promote tintability, flow additives, ultraviolet absorbers, etc., if so desired.

The top layer may also incorporate colloidal silica where it is desired to increase the abrasion resistance of the coating. The particle size of the colloidal silica may be from about 1 to 150 nanometers but preferably from about 15 to 30 nanometers. The colloidal suspension may be in water, any of the cellosolves, alcohols or any other organic solvent, although cellosolve preparations are preferred. The relative proportion of colloidal silica must be such as to allow the organic silicon compound or the hydrolyzed product thereof, to be contained in an amount, of at least 20% by weight based on the weight of the cured coating layer-forming components. If the solid content equivalent weight of the organic silicon compound or the hydrolyzed product thereof, is smaller than 20%, such properties as adhesion, surface hardness, and durability are decreased. A preferred range of organic silicon compound from about 45%-75% by weight should be added.

A refractive index equation (B), involving the top layer of the present invention was determined by regression analysis. The selected composition comprised a polysiloxane resin consisting of 43% methyltrimethoxysilane and 57% gamma-glycidoxypropyltrimethoxysilane in any proportion to SiO$_2$ (silicon dioxide). The percentage of silica is based on the solid content equivalent weight of the organic silanes. The equation is as follows:

(B) ref. index (sodium line) = (−0.0002635)(% SiO$_2$) + 1.4772

The correlation coefficient was 0.97. By extrapolation, 100% SiO$_2$ would have a refractive index of 1.4509, which is equivalent to the value obtained by vacuum deposition of silica (1.450). At 0% of SiO$_2$ the calculated refractive index is 1.4772 which corresponds to the refractive index of the cured polysiloxane resin. This refractive index is lower than the value for CR-39 substrates (1.500) and is typical of polysiloxane resins that do not contain phenylsiloxane compounds or any other refractive index enhancers such as aromatic rings, halogenated siloxanes, mercaptosiloxanes, etc.

For the purpose of providing smooth coatings, a flow control agent made of a block copolymer of an alkylene oxide and a silicon resin such as SF1188 (made by General Electric), may be incorporated into the coating composition of each layer if so desired. The amount of flow control agent to be added need not be very large to manifest its effect, and generally, the amount ranges from 0.01%-1.0% by weight of the coating solution-forming components for each layer. Most preferably the flow additive should be in the range from about 0.08%-0.15% by weight.

The use of a curing catalyst results in a coating composition having a long pot life, rigidifying quickly at a relatively low temperature, and exhibiting satisfactory adhesiveness to CR-39 substrates. A variety of Bronsted acids or Lewis acids are known to be curing catalysts for siloxane resins and for epoxy group-containing siloxane resins. The Bronsted acids include latent catalytic acids such as ammonium perchlorate, ammonium chloride, ammonium sulphate, etc. (GB Patent Application 2 137 648) and other acids such as perchloric acid, paratoluenesulfonic acid, etc. The Lewis acids include aluminum acetylacetonate, and many other metal acetylacetonates (U.S. Pat. No. 4,590,117 and U.S. Pat. No. 4,211,823), as well as $SnCl_4$, $ZnCl_4$, etc. The Bronsted acids either act too fast (for example, perchloric acid), with the consequent reduction in pot life for siloxane solutions, or in the case of latent Bronsted acids, they act too slowly in opening the epoxy group (ammonium perchlorate, etc.). However, Bronsted acids are good adhesion promoters to the substrates. The property of good adhesion to substrates is described in GB Patent 2 137 648. This patent also describes coatings containing aluminum acetylacetonate that tend to exhibit poor surface rigidity and poor adhesiveness to substrates (page 4, lines 70–73). However, it is known that Lewis acids such as aluminum acetylacetonate are very good catalysts for epoxy opening.

It was found in the present invention that a combination of latent catalysts, such as ammonium perchlorate or other latent Bronsted acids mentioned previously, when combined with Lewis acids, such as aluminum acetylacetonate provided synergistic, fast and efficient curing of siloxane resins. These siloxane resins contained epoxy groups, such as the ones described previously, including gamma-glycidoxypropyltrialkoxysilanes. These silanes are present on the top layer of the present invention. The curing is fast, so as to allow the coatings to cure to a tack-free state right after they are formed. This is accomplished through application of 30 sec-60 sec of heat in a simple electrical coil-heated station, all in a continuous process. The process prevents the coating from acquiring flying particles from the air and dust and allows the handling of the lens without damage to the coating. This catalyst induced extra-fast curing applies to relatively thin coatings (less than 200 nanometers, 0.2 microns) and to relatively thick coatings (more than 200 nanometers). If only ammonium perchlorate or aluminum acetylacetonate is used, the extra-fast curing is not obtained and the coating is tacky or very fluid under the same heating conditions. The extra-fast curing is very important for any type of coating, but particularly for antireflective coatings because the coatings are very thin.

For the bottom layer, we found that the layer can be cured without the addition of catalysts. Actually, the organic titanium compounds used in this present invention act as catalysts for the polymerization of the polysiloxane resin. This is so because the organic titanium compounds are Lewis acids themselves. Taber abrasion comparison between coatings produced by uncatalyzed and catalyzed formulations gave the same values. Due to the powerful acid action of the organic titanium compound, any addition of acids or of aluminum acetylacetonate catalysts give place to yellow coatings due to a partial scorching of the coating. We are able to obtain almost colorless coatings by not adding catalysts to the bottom layer.

After the initial curing, the coating can be postcured to any desired degree, and in fact, each time a coating is applied, the coating is postcured by hot air at a temperature not less than 70° C. and preferably about 100° C. for a period of from about 20 minutes to 5 hours, preferably about 4 hours. Alternatively, the coating can be exposed to infrared radiation or to any other radiation that will thermally cure the coating to completion. If the individual layers are not postcured correctly, the following layer will penetrate the previous layer, and the antireflective properties of the final product will be decreased considerably.

Certain solvents are effective for stabilizing the liquid coating compositions. For example, monoalkyl ethers of ethylene glycol or diethylene glycol, alcohols having up to 8 carbon atoms, diketones such as acetylacetone, and ketoesters such as ethyl acetoacetate are especially effective in stabilizing alkoxides, chelate compounds of titanium, and siloxane resins. Solvents such as monoethyl ether or monopropyl ether of ethylene glycol are preferred.

The coating of a glass or CR-39 substrate with each coating layer may be accomplished by any known method, such as the immersion method, the spray method, the roller coating method, the spinning method, etc. However, the spinning method is preferred.

The properties of the coatings are discussed in the following examples, and have been individually monitored.

Abrasion Resistance: There are two tests for abrasion resistance. The first test is the Taber abrasion resistance test. Calibrase abrading wheels CS-10F profiled to the curved surface of the lens were used under a load of 500 g, and the haze readings at different number of cycles were recorded. This test method is a modification of the corresponding ASTM D 1044–82. The second test is the steel wool test performed by rubbing the surface with steel wool #0000. This property was rated on the following scale.

A—No scratches sustained with rubbing.
B—Scratches sustained slightly with rubbing.
C—Scratches sustained even with weak rubbing.

Adhesiveness: This property was determined by the so-called cross-cut tape test, i.e., by cutting 11 parallel lines each in two perpendicularly crossing directions with a sharp razor blade. The lines are cut at fixed intervals of approximately 1 mm. on the surface of the coating of a given sample to produce a total of 100 squares, adhesive cellophane tape is applied to the cut squares, the tape is peeled, and the squares on which the coating film remains are counted. The adhesiveness is reported by the number of squares remaining.

Hot Water Resistance: This property was determined by placing a given sample in boiling water for one hour and examining the coating at the end of the period. The adhesiveness test was then administered with the cross-cut tape test.

Resistance to Photooxidation: The test entailed placing the samples under a General Electric or Sylvania sun lamp, 275 watts, at a distance of 24 cm. The samples were examined at set time intervals and tested for abrasion with steel wool #0000. The samples then were subjected to 10 minutes of tinting in a tint bath at 100° C. that contained BPI (Brain Power, Inc.) sun-gray dispersion dyes. The durability of the coating was recorded.

Wearing Trials: Selected subjects were provided with glasses coated with the selected coating compositions and the coating wearability was recorded.

Tintability: The coated lenses were placed in a boiling-water tint bath containing BPI sun-gray dispersion dyes, one flask per liter of water. The lens transmittances were recorded at specified intervals.

Impact Resistance: Coated and uncoated plano lenses were subjected to the impact of a 16.27 g steel ball dropped from a height of 52 inches (FDA test). Uncoated lenses do not break or crack under this test. Any defects that appeared on the coated lenses were recorded.

The present invention also provides for preselected equations relating to the thickness of the coating layers and the refractive indices of the substrate and each of the coating layers.

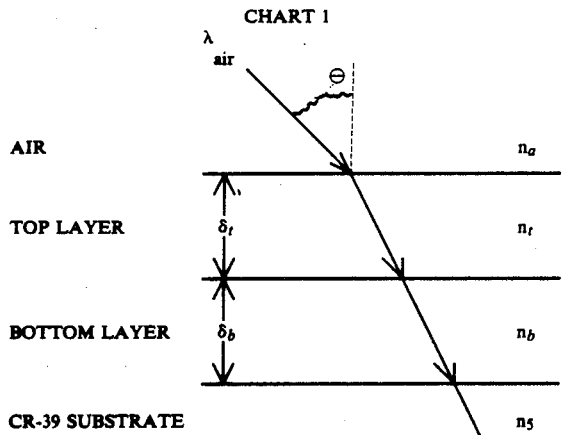

CHART 1

Chart 1 shows the basic diagram of the two-layer antireflective coating and the symbol representations for the equations. Thickness in nanometers is represented by $\delta$, refractive index by $n$, wavelength in air for oncoming light by $\lambda$, and angle of incidence by $\theta$. The thicknesses of each of two coating layers is in accordance with preselected equations, and the refractive indices of the coating layers satisfy the following requirements:

$$n_s < n_b > n_t$$

where $n_s$ represents the refractive index of the substrate, $n_b$ represents the refractive index of the bottom layer, and $n_t$ represents the refractive index of the top layer.

For these refractive index relationships, equations (1) and (2) were derived:

$$\delta_t = \frac{L \cdot \lambda_a}{4 n_t (n_t^2 - \sin^2\theta)^{\frac{1}{2}}} \quad (1)$$

$$\delta_b = \frac{M \cdot \lambda_a}{2 n_t (n_b^2 - \sin^2\theta)^{\frac{1}{2}}} \quad (2)$$

The angular dependence of the incident light must be taken into account in such a way that the reflections at the interface of the air continuum to top layer, and top layer to bottom layer is 180° out of phase with the reflections at the interface of the top layer to bottom layer, and bottom layer to substrate, respectively. The value that each coating layer thickness should have depends on the composition of the layers (that is, refractive index). in equation (1), L is an odd positive integer because even positive integers would cause reinforcement of the reflection which is not desirable. In equation (2), M is any positive integer.

In obtaining the previously stated equations, it must be considered whether the beam of light suffers an internal or an external reflection. The internal reflection is obtained when a given layer has a higher refractive index than the layer below it. The wave suffers an 180° phase displacement due to the internal reflection in the high refractive index layer. Equation (2) shows the relationship obtained with this type of reflection. External reflection occurs when a given layer has lower refractive index than the layer below it. Here, the wave does not suffer any phase displacement. Equation (1) applies to this type of reflection. For any equation, when $b=0$, that is, for a beam of light perpendicular to the surface of the substrate, equations (1) and (2) become equations (1') and (2'), respectively:

$$\delta_t n_t = \frac{L \cdot \lambda_a}{4 n_a} ; n_a = 1.000 \quad (1')$$

$$\delta_b n_b = \frac{M \cdot \lambda_a}{2 n_t} \quad (2')$$

The optical thickness $\delta_q n_q$, in which q=t,b, can be obtained through rearrangement of the equations when $\theta=0$. Notice that $\lambda_a$ (wavelength of light in air) in every equation is divided by the refractive index of the previous layer of the light path. Thus, the optical thickness of each layer is completely different as to the way it is described in U.S. Pat. No. 4,590,117 and related prior patents which use the term $\lambda/4$ or multiples of it for the optical thickness of any layer of two- and three-layer coatings. Notice also that equation (2') has $\frac{1}{2}$ as the coefficient instead of the $\frac{1}{4}$ used in the mentioned patents. Thus, thicknesses of each coating layer can be defined by equations (1), (2), and (1'), (2') for the two-layer antireflective coating provided. Different or equal wavelengths of visible light can be chosen to determine the appropriate thickness for each layer. Customery coating methods may be adopted, but in order to control the coating thickness of the coating layer, curtain flow coating, dip coating, roller coating and spin coating methods can be used. We prefer spin coating.

A final object of the present invention is to provide a process for preparing a two-layer antireflective coating with improved adhesion on CR-39 or glass substrate. The first step is to prepare the CR-39 or glass substrate for adhesion by the bottom layer. This is accomplished by etching the substrate with a caustic solution comprising a strong base, such as potassium hydroxide (KOH) or sodium hydroxide (NaOH) (the etching mechanism on CR-39 substrates was published in 1980; cf. CA93:115303p). The effective concentration of caustic for etching should contain either potassium or sodium hydroxide in the range from about 10%-40% by weight of the caustic solution and most preferably from about 25%-35% by weight of the caustic solution. The use of potassium hydroxide is preferred. (An effective concentration or amount, as the term is used here and hereinafter in the specification and claims, is the concentration or amount sufficient to bring about the best overall antireflective properties.) U.S. Pat. No. 4,611,892 (1986) claims solutions of caustic between 0.1%-30% by weight in aqueous polyethyleneglycol or in water with an anionic or non-ionic surfactant. (The surfactant being in a range of from 0.01%-5%). This patent claims that etching high refractive index lenses, containing some CR-39, with this caustic solution, brings good adhesion of a cured siloxane coating to the lens. Surfactant concentrations below 0.01% by weight were not within acceptable limits because lens surface washability was reduced. Concentrations of caustic above 30% by weight were excluded because the viscosity of the aqueous solution increased to a point where the solution became unsuitable for chemically treating the surface of the lens.

By adding an effective amount of at least one fluorosurfactant (a fluorinated surfactant) in the caustic solution, concentrations of surfactant below 0.01% by weight could be used. Thus, the present invention is novel in the use of fluorosurfactants in a lower amount as opposed to the use of other types of surfactants that need to be added in a greater amount.

Fluorosurfactants are preferable to other types of surfactants because the presence of carbon-fluorine bonds cause the fluorosurfactant to be more resistant to caustic.

It was found that two types of fluorosurfactants could be used for the purposes of the present invention in the etching step. Both fluorosurfactants (or also referred to as fluorochemical surfactants) excel in wetting action and chemical and thermal stability. One such fluorosurfactant that can be effectively used in the present invention is Zonyl FSN made by DuPont Co. (40% in isopropanol or 100%). This particular fluorosurfactant is a molecule consisting of two moieties. The first moiety repels water and is comprised of a completely fluorinated hydrocarbon from 3-8 carbons. The second moiety attracts water and is comprised of polyethylene glycol. The formula for Zonyl FSN is as follows:

$$R_F CH_2 CH_2 O (CH_2 CH_2 O)_x H$$

where
$$R_F = F(CF_2 CF_2)_{3-8}$$

The other fluorosurfactant that can be effectively used in the present invention is Fluorad, FC-170C made by 3M Co. It acts similarly to Zonyl FSN, and like Zonyl FSN is nonionic. FC-170C is a fluorinated alkyl polyoxyethylene ethanol but is unlike Zonyl FSN in that it is not completely fluorinated. Although both fluorosurfactants mentioned can be used, Zonyl FSN is preferred.

Since the surface tension of the caustic solution practically arrives at a minimum around 0.001%, a concentration of fluorosurfactant below 0.01% by weight of the caustic solution could be used to obtain optimum results in etching the substrate. Thus, at 25° C., a 10% aqueous solution of potassium hydroxide with 0.001%, 0.01%, and 0.1% surfactant has a surface tension of 30, 25, and 23 dynes/cm, respectively (Zonyl fluorosurfactants, Product Information Bulletin, DuPont).

Thus, in accordance with the present invention for the process for preparing an antireflective coating, the aqueous caustic solution used in etching the substrate should contain an effective amount of fluorosurfactant. The effective amount of fluorosurfactant should be in a range from about 0.0001%-5% by weight of the aqueous caustic solution. The upper limit of fluorosurfactant depends on the solubility extremes of Zonyl FSN in a high concentration of caustic. The concentration of fluorosurfactant should preferably be from about 0.03%-0.15% by weight. Fluorad FC-170C can also be used. Caustic concentrations of 30% by weight or higher can also be used without negative effects. The most preferred caustic concentration is from about 25%-35% by weight.

Because selected caustic concentrations are used, etching time can be reduced to as little as 30 seconds, although 60 sec-85 sec is preferred. Typically, U.S. Pat. No. 4,611,892 reports 3-5 minute etching times in their examples. Obviously, the productivity and quality of the product increases greatly with the reduction in etching time. In addition, Zonyl FSN is very resistant to the chemical degradation caused by the caustic upon a surfactant. This is important when higher concentrations of caustic are used in combination with relatively high temperatures (30°-50° C.) to increase the speed of etching.

The following examples describe in detail the invention, but by no means limit the scope of it.

EXAMPLE 1

(1) Preparation of Coating Composition for Bottom Layer (a) Preparation of Silane Hydrolyzate In a reactor were placed 250 g of phenyltrimethoxysilane (PTS), 188.6 g of gamma-glycidoxypropyltrimethoxysilane (GPTS) (ratio of PTS/GPTS is 57/43 by weight) and 303.5 g of cellosolve (2-ethoxyethanol). Then, in a period of 5 minutes, 220 g of 0.01 N HCl were added with strong stirring. Afterwards, 330 g of distillate were obtained at atmospheric pressure in a rotavapor. (A rotavapor is a rotatory evaporator). The final solution contained 47% solids by weight based on the solid equivalent weight.

(b) Preparation of Coating Composition (ratio of TPT/polysiloxane=11/89 by equivalent weights)

To 500 g of the hydrolyzate mentioned above were added 5000 g of cellosolve and 30 g of tetraisopropyltitanate (TPT) under stirring.

(c) Coating and curing

Diethyleneglycol bisallylcarbonate polymer lenses (plano lenses CR-39, 70 mm diameter and 2 mm in thickness), which had been dipped in an aqueous 35% potassium hydroxide solution at 40° C. with 0.08% fluorosurfactant Zonyl FSN for 60 seconds and then washed, were spin-coated with the coating composition prepared in (1b) at 1800 rpm and then cured for 60 sec by placing them at about 15 cm from a small heating station electrically heated with coils. The lenses were dry and non-tacky. Then, they were transferred to an infrared oven for 10 minutes. The layer had a refractive index of 1.543 and had a concentration of metal oxide ($TiO_2$) of 3.44%. The layer thickness was 103 nanometers (0.103 microns).

(2) Preparation of Coating Composition for Top Layer (a) Preparation of Silane Hydrolyzate In a round-bottom one-necked flask were placed 250 g of GPTS, 188 g of methyltrimethoxysilane (MTS) (ratio GPTS / MTS is 57/43 by weight), and 345 g of ethylcellosolve. Then, in a period of 5 minutes, 220 ml of 0.01 N HCl were added with strong stirring. The colorless and transparent solution was then distilled at atmospheric pressure in a rotavapor to obtain 330 g of distillate. The final solution contained 40% solids by weight based on the solid equivalent weight of the original amount of silane monomers.

(b) Preparation of Coating Composition

To 568 g of the hydrolyzate mentioned in (2a) were added 4600 g of ethylcellosolve, 450 g of colloidal silica in ethylcellosolve (30% solids, produced by Nalco), 22.5 g of a 10% aqueous solution of ammonium perchlorate, 5.5 g of aluminum acetylacetonate, 0.45 g of SF1188 silicon block copolymer (made by General Electric).

(c) Coating and Curing

The lenses obtained in (1c) were coated with composition mentioned in (2b), according to the spinning method at a speed of 1700 rpm for 50 seconds. The coated lenses were cured for 60 seconds by placing them 8 cm from a small heating station mentioned in (1c). The lenses were dry and non-tacky when touched with the fingers. However, with the omission of either ammonium perchlorate or aluminum acetylacetonate, the lenses were tacky under the same curing conditions. When the bottom layer was 1 micron or more in thickness, the lenses were not only tacky but slippery and wet. The lenses were postcured in an infrared oven for 10 minutes followed by an air oven for 4 hours at 100° C. The layer had a refractive index of 1.467 and a thickness of 110 nanometers (0.11 microns).

The coated lens had a bluish neutral reflection and reflected only 4.5% of white light whereas an uncoated lens reflected 8% of white light. The calculated wavelengths of interference in accordance with equations (1') and (2') were 466 nanometers for bottom layer and 645 nanometers for the top layer. After 200 hours of exposure under the sun lamp, the coating had no significant decrease of steel-wool abrasion, no crazing, no significant fading in color of reflected light, and no loss of any coating off the lens surface if tinted for 10 minutes at 100° C. FIG. 1 shows the reflection photospectrum of an unweathered and a weathered lens. No significant change is observed. The wearing trial did not show any peeling or scratching in the coating even after 10 months of rough use. FIG. 2 shows the comparison of abrasion resistance and FIG. 3 the comparison of tintabilities. The impact resistance test did not give any cracking or breaking of the coating or of the lens.

EXAMPLE 2

A lens was coated with a bottom layer as described in Example 1, sections (a)–(c). Then a top layer was applied as in Example 1, except that the composition was comprised of a commercial preparation based on GPTS and an undisclosed tinting additive. The results were similar to the ones of Example 1, section (c).

COMPARATIVE EXAMPLE 1

The top and bottom layers were placed as shown in Example 1, except that the $TiO_2$ concentration of the bottom layer was increased to 12%, 18% and 100%. After 98 hours of exposure, the 12% showed the loss of patches of coating on the tinting test. The 18% showed total loss of coating after the tinting test. For the 100%, the lenses showed poor adhesion even before weathering. A 50 minute tinting test resulted in streaks underneath the coating. This was caused by the poor adhesion between the titanium dioxide layer and the CR-39 substrate. Intact lenses after 24 hours under the sun lamp showed a significant weakening of abrasion resistance under the steel-wool test, although the reflection color did not change significantly. Ten minute tinting of lenses expose to 50 hours under the sun lamp caused the entire coating to be lost.

COMPARATIVE EXAMPLE 3

When the bottom and top layers of Example 1 are placed on an unetched CR-39 lens, the boiling water adhesion is very poor.

COMPARATIVE EXAMPLE 4

When surfactant Zonyl FSN is not placed into the etching caustic solution, the etching is uneven. Also adhesion failures are shown by the lens in some spots, mostly in regions where fingerprints, air bubbles (trapped under the lens) or oils have touched the lens.

What is claimed is:

1. A two-layer antireflective coating stacked on a substrate, comprising a cured bottom layer containing between 0.28 and 10% by weight of titanium dioxide and a titanium-free cured top layer, wherein both the bottom and the top layers contain polysiloxane resins.

2. A two-layer antireflective coating composition in accordance with claim 1, wherein said substrate is allyl diglycol carbonate polymer.

3. A two-layer antireflective coating composition in accordance with claim 1, wherein said substrate is glass.

4. A two-layer antireflective coating composition in accordance with claim 1, wherein the composition of said bottom layer (adjacent to substrate) comprises a mixture of:
   (a) titanium dioxide comprising less than 10% by weight of the cured coating layer-forming components;
   (b) a polysiloxane resin comprising 90% or greater by weight of the cured coating layer-forming components and formed from a mixture of:
      (i) a phenyltrialkoxysilane monomer comprising from about 20%–80% by weight of the silane monomer mixture;
      (ii) a gamma-glycidoxypropyltrialkoxysilane monomer comprising from about 20%–80% by weight of the silane monomer mixture.

5. A two-layer antireflective coating composition in accordance with claim 4, wherein said titanium dioxide comprises from about 4%–10% by weight of titanium dioxide derived from titanates selected from the group consisting of tetraisopropyl titanate (TPT), tetraethyl titanate (TET), and tetrabutyl titanate (TBT).

6. A two-layer antireflective coating composition in accordance with claim 5, wherein said titanate comprises tetraisopropyl titanate (TPT).

7. A two-layer antireflective coating composition in accordance with claim 5, wherein said titanate comprises tetraethyl titanate (TET).

8. A two-layer antireflective coating composition in accordance with claim 5, wherein said titanate comprises tetrabutyl titanate (TBT).

9. A two-layer antireflective coating composition in accordance with claim 4, wherein said phenyltrialkoxysilane monomer comprises from about 47%–67% by weight of phenyltrimethoxysilane and wherein said titanium dioxide comprises from about 6%–9% by weight of the cured coating layer-forming components.

10. A two-layer antireflective coating composition in accordance with claim 4, wherein said gamma-glycidoxypropyltrialkoxysilane monomer comprises from about 33%–53% by weight gamma-glycidoxypropyltrimethoxysilane and wherein said titanium dioxide comprises from about 6%–9% by weight of the cured coating layer-forming components.

11. A two-layer antireflective coating composition in accordance with claim 1, wherein the composition of said top layer comprises:
   (a) a polysiloxane formed from a mixture of:

(i) a gamma-glycidoxyalkyltrialkoxysilane monomer comprising from about 30%–100% of the silane monomer mixture;

(ii) an alkyltrialkoxysilane monomer comprising 0%–70% by weight of the silane monomer mixture.

12. A two-layer antireflective coating composition in accordance with claim 11, wherein said gamma-glycidoxyalkyltrialkoxysilane monomer comprises from about 30%–100% gamma-glycidoxypropyltrimethoxysilane.

13. A two-layer antireflective coating composition in accordance with claim 11, wherein said alkyltrialkoxysilane monomer comprises 0%–70% methyltrimethoxysilane.

14. An allyl diglycol carbonate polymer or glass substrate having a two-layer antireflective coating composition comprising a bottom layer containing between 0.28 and 10% by weight of titanium dioxide and a polysiloxane resin and a titanium-free top layer containing a polysiloxane resin; wherein the refractive indices of said coating layers satisfy the following requirements:

$$n_s < n_b > n_t$$

where $n_s$ represents the refractive index of said substrate, $n_b$ represents the refractive index of said bottom layer, and $n_t$ represents the refractive index of said top layer.

15. A substrate having an antireflective coating composition in accordance with claim 14, wherein the thickness of said bottom coating layer is determined by an equation satisfying the following requirements:

$$\delta_b = \frac{M * \lambda_a}{2n_t(n_b^2 - \sin^2\theta)^{\frac{1}{2}}}$$

wherein $\delta_b$ represents thickness in nanometers, $\lambda_a$ represents wavelength in air for oncoming light (in nanometers), $\theta$ represents angle of incidence, n represents the refractive index, and M represents any positive integer.

16. A substrate having an antireflective coating composition in accordance with claim 14, wherein the thickness of said top layer is determined by an equation satisfying the following requirements:

$$\delta_t = \frac{L * \lambda_a}{4n_d(n_t^2 - \sin^2\theta)^{\frac{1}{2}}}$$

wherein $\delta_t$ represents thickness in nanometers, $\lambda_a$ represents wavelength in air for oncoming light (in nanometers), $\theta$ represents angle of incidence, n represents the refractive index, and L represents an odd positive integer.

17. A process for preparing a two-layer antireflective coating on an allyl diglycol carbonate polymer or glass substrate comprising the steps of:

(d) etching said substrate with a caustic solution comprising at least one fluorosurfactant in an effective amount;

(b) applying a bottom layer to said substrate, and curing said bottom layer to obtain a layer comprising between 0.28 and 10% by weight of titanium dioxide and polysiloxane resin;

(c) applying a top layer to said cured bottom layer, the top layer being titanium-free and comprising polysiloxane resins, and curing said top layer.

18. A process in accordance with claim 17, wherein said caustic solution of step (a) comprises from about 10%–40% by weight of strong base selected from the group consisting of potassium hydroxide (KOH) and sodium hydroxide (NaOH).

19. A process in accordance with claim 18, wherein said caustic solution of step (a) comprises from about 25%–35% potassium hydroxide (KOH) by weight of aqueous caustic solution.

20. A process in accordance with claim 17, wherein said fluorosurfactant of step (a) is selected from the group consisting of $R_FCH_2CH_2O(CH_2CH_2O)_xH$, where $R_F = F(CF_2CF_2)_{3-8}$, and a fluorinated alkyl polyoxyethylene ethanol.

21. A process in accordance with claim 20, wherein said fluorosurfactant has the formula: $R_FCH_2CH_2O(CH_2CH_2O)_xH$, where $R_F = F(CF_2CF_2)_{3-8}$.

22. A process in accordance with claim 17, wherein said effective amount of fluorosurfactant of step (a) comprises from about 0.0001%–5% by weight of aqueous caustic solution.

23. A process in accordance with claim 22, wherein said fluorosurfactant comprises from about 0.03%–0.15% by weight of aqueous caustic solution.

* * * * *

UNITED STATES PATENT AND TRADEMARK OFFICE
CERTIFICATE OF CORRECTION

PATENT NO. : 5,104,692
DATED      : Apr. 14, 1992
INVENTOR(S) : Hector Belmares It is certified that error appears in the above-identified patent and that said Letters Patent is hereby corrected as shown below:

On the title page:   item [22]: change "Filed: Apr. 20, 1990" to --Filed: Apr. 30, 1990--.

Signed and Sealed this

Twenty-ninth Day of June, 1993

Attest:

MICHAEL K. KIRK

*Attesting Officer*            *Acting Commissioner of Patents and Trademarks*